April 28, 1970 F. T. SMITH 3,508,476
METHOD AND APPARATUS FOR TOWING AND SUSPENDING
A COMPACTOR FROM A PAVER
Filed Aug. 30, 1967 8 Sheets-Sheet 1

INVENTOR.
Fred T. Smith
BY Hill, Sherman, Meroni, Gross & Simpson ATTORNEYS

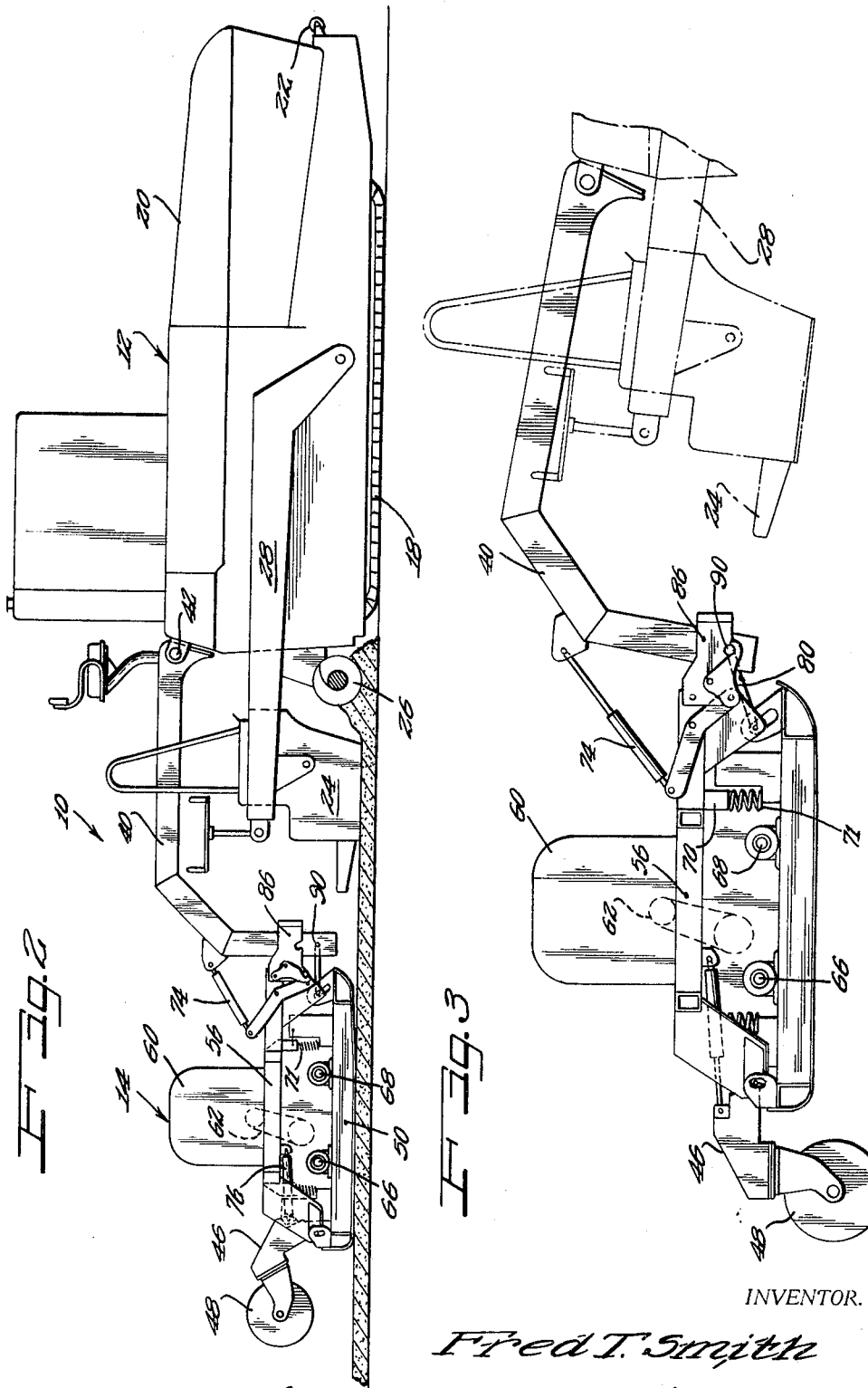

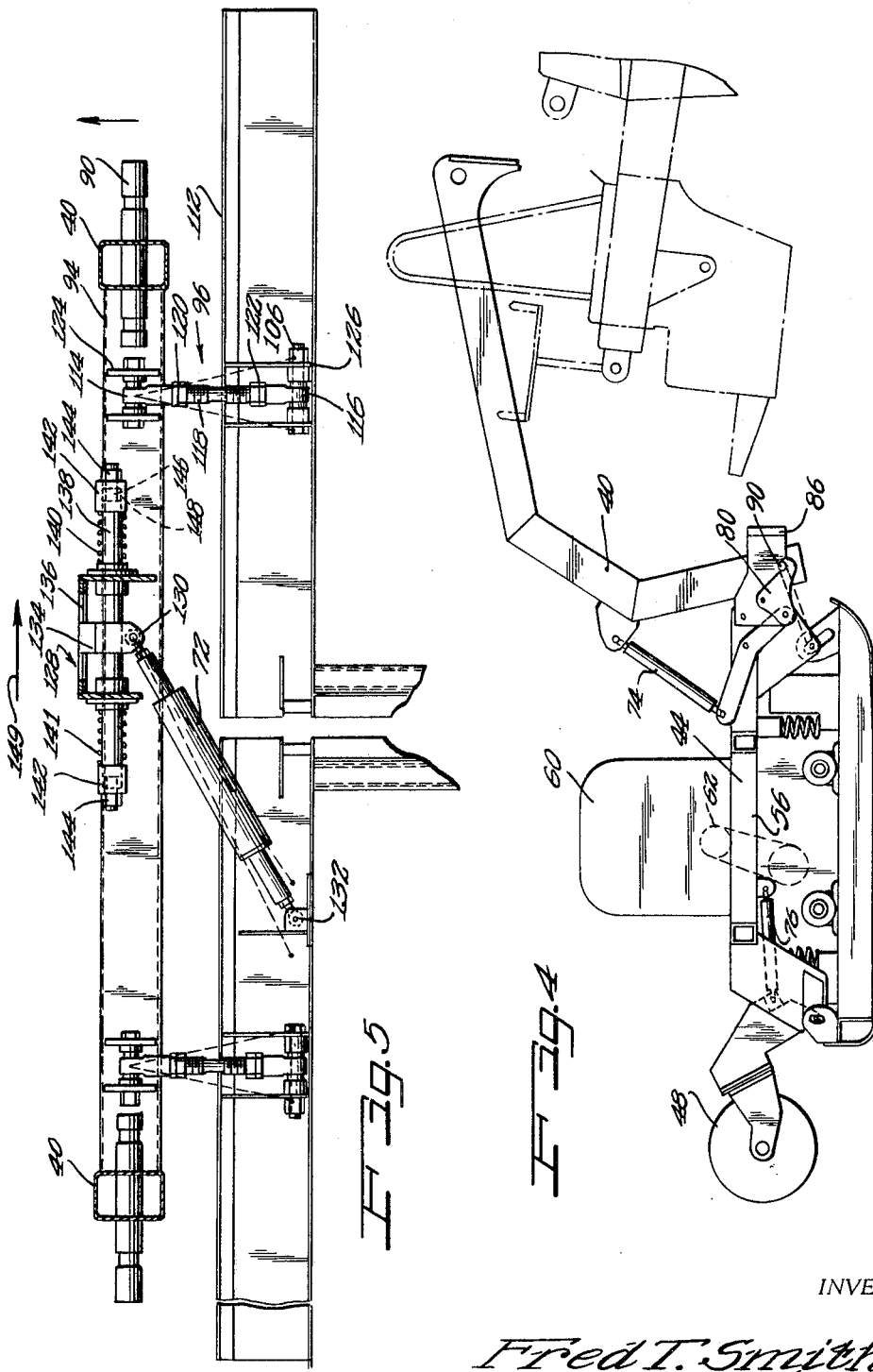

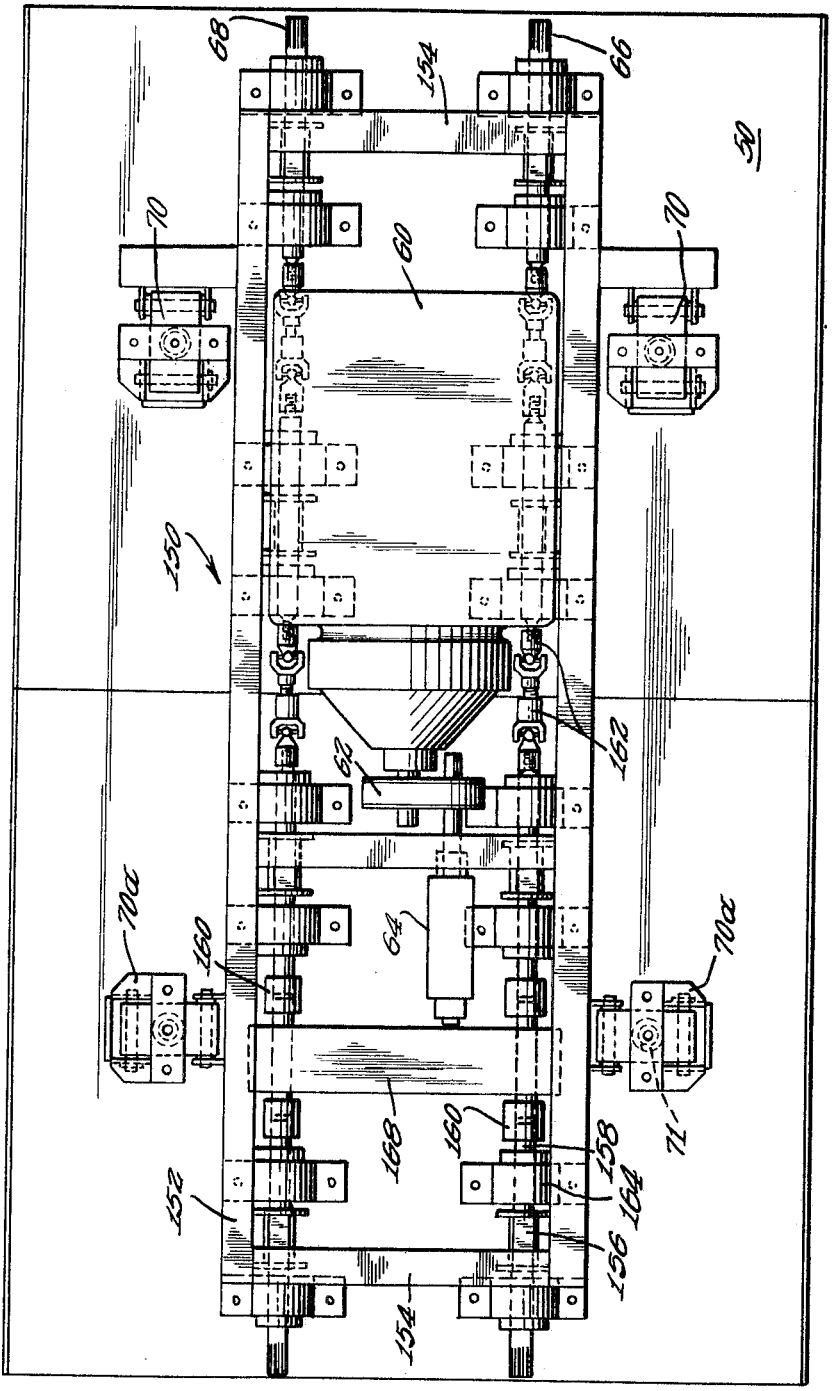

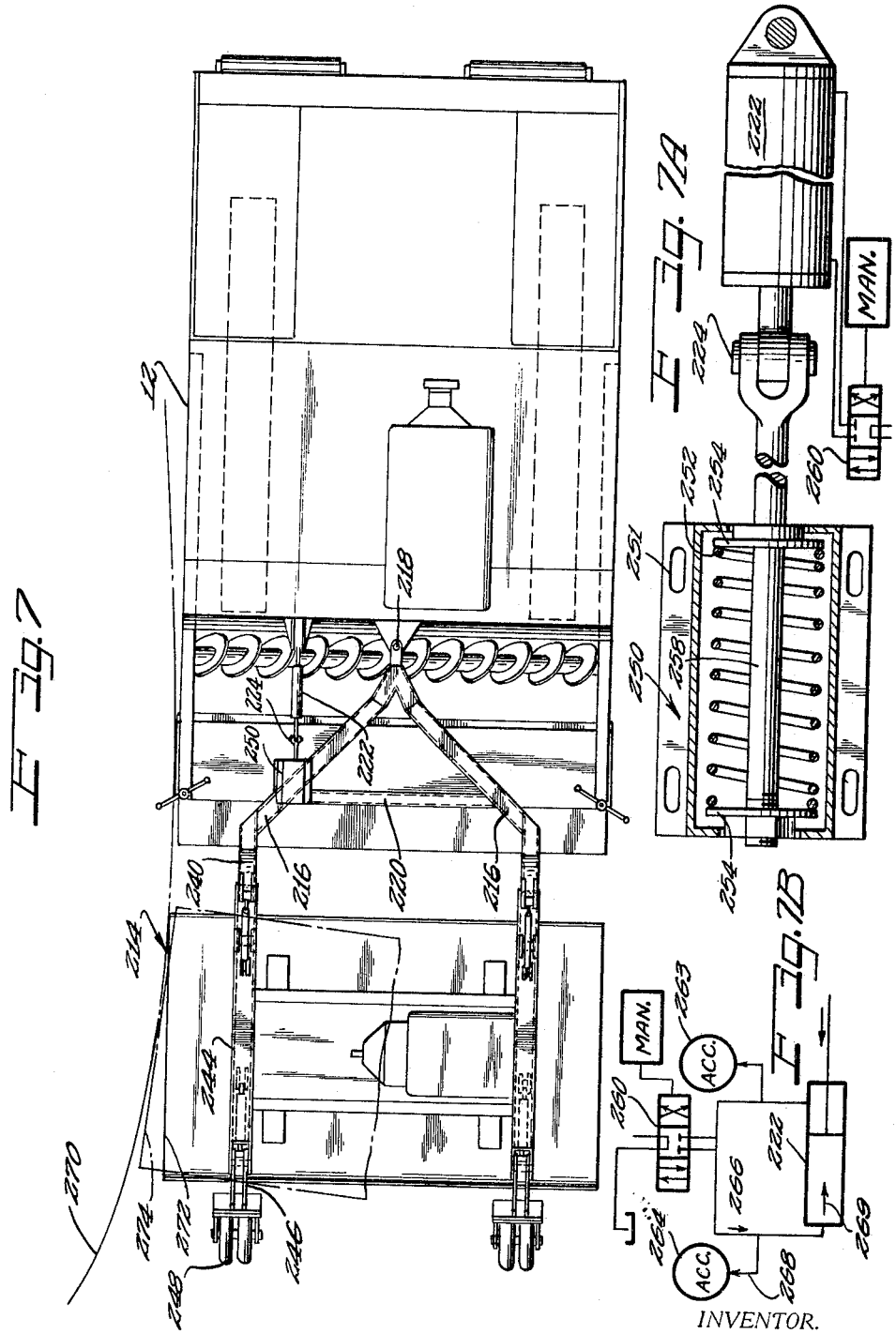

April 28, 1970     F. T. SMITH     3,508,476
METHOD AND APPARATUS FOR TOWING AND SUSPENDING
A COMPACTOR FROM A PAVER
Filed Aug. 30, 1967     8 Sheets-Sheet 6
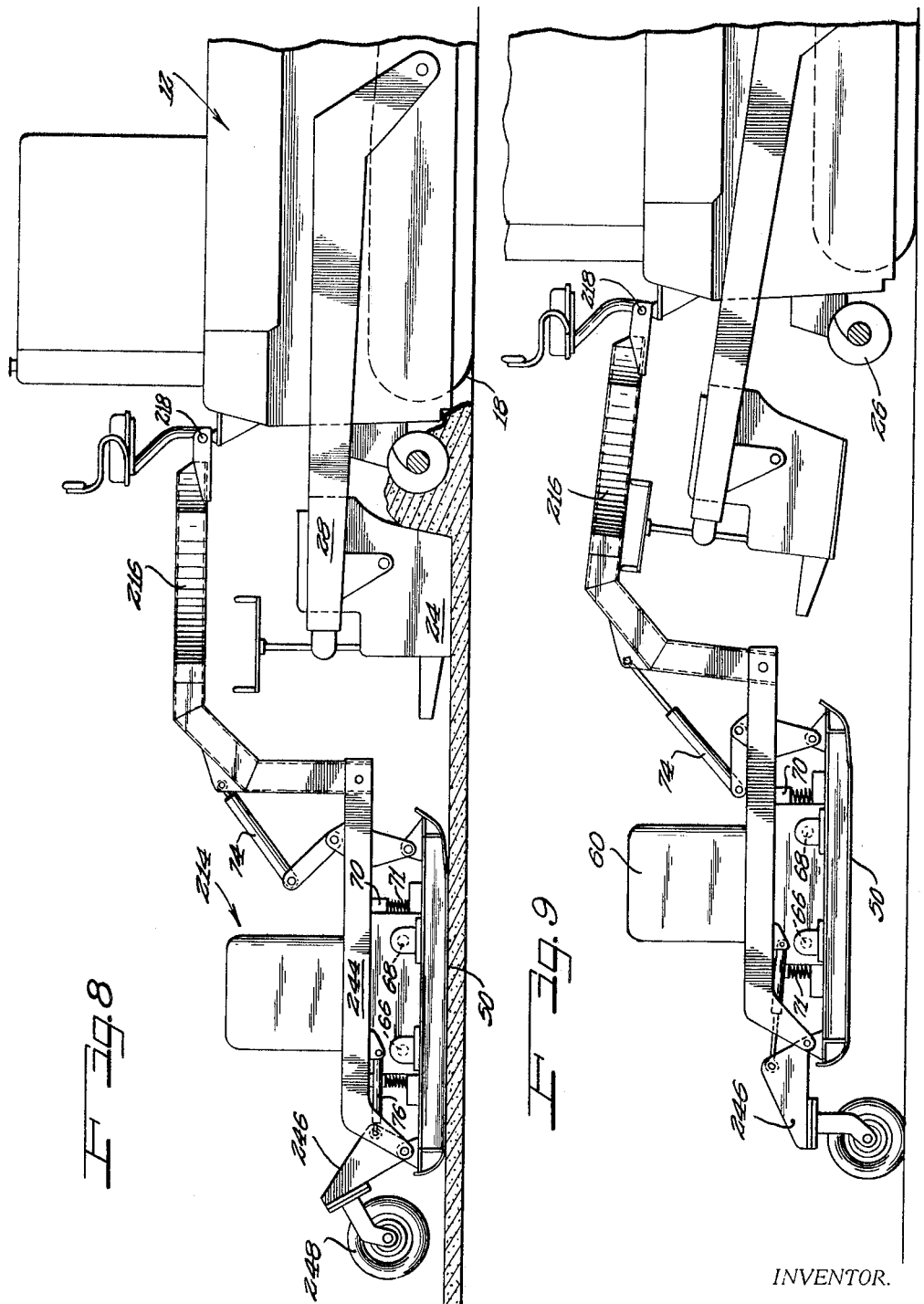
INVENTOR.
Fred T. Smith

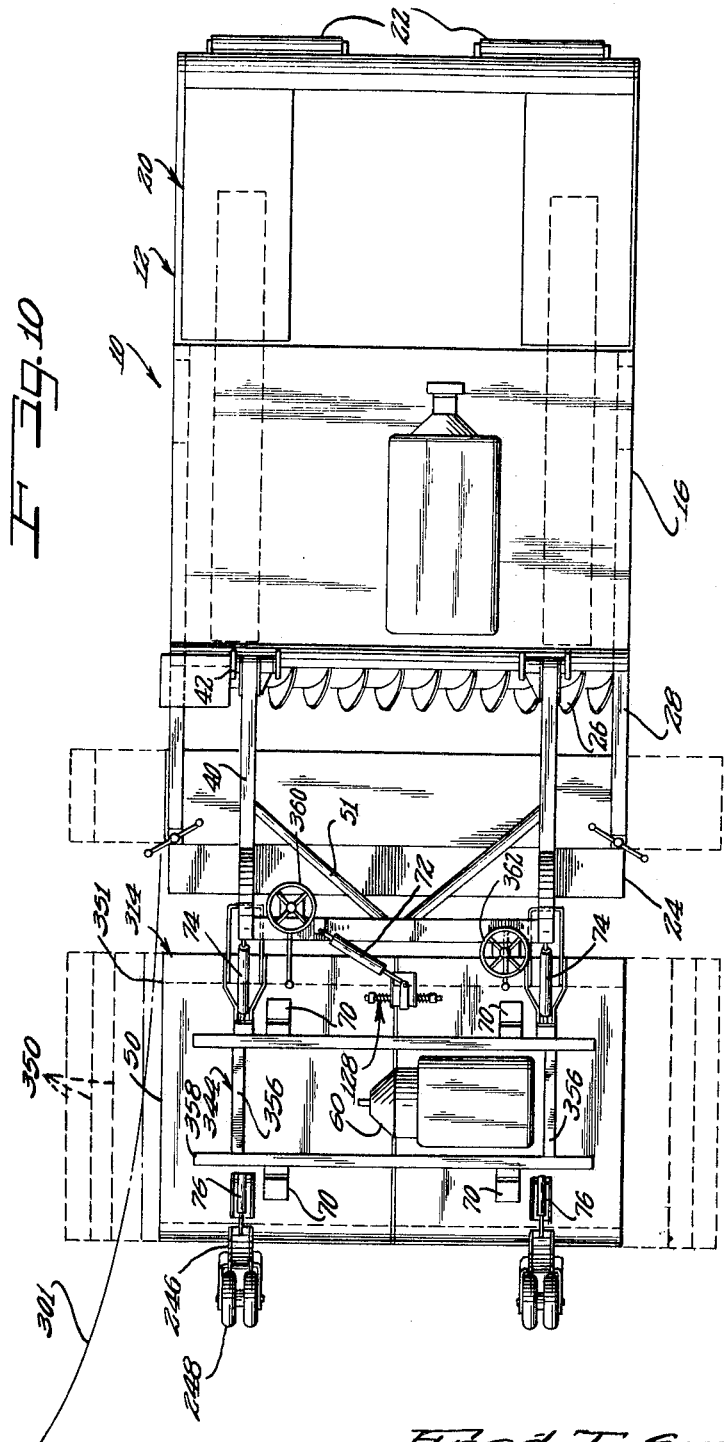

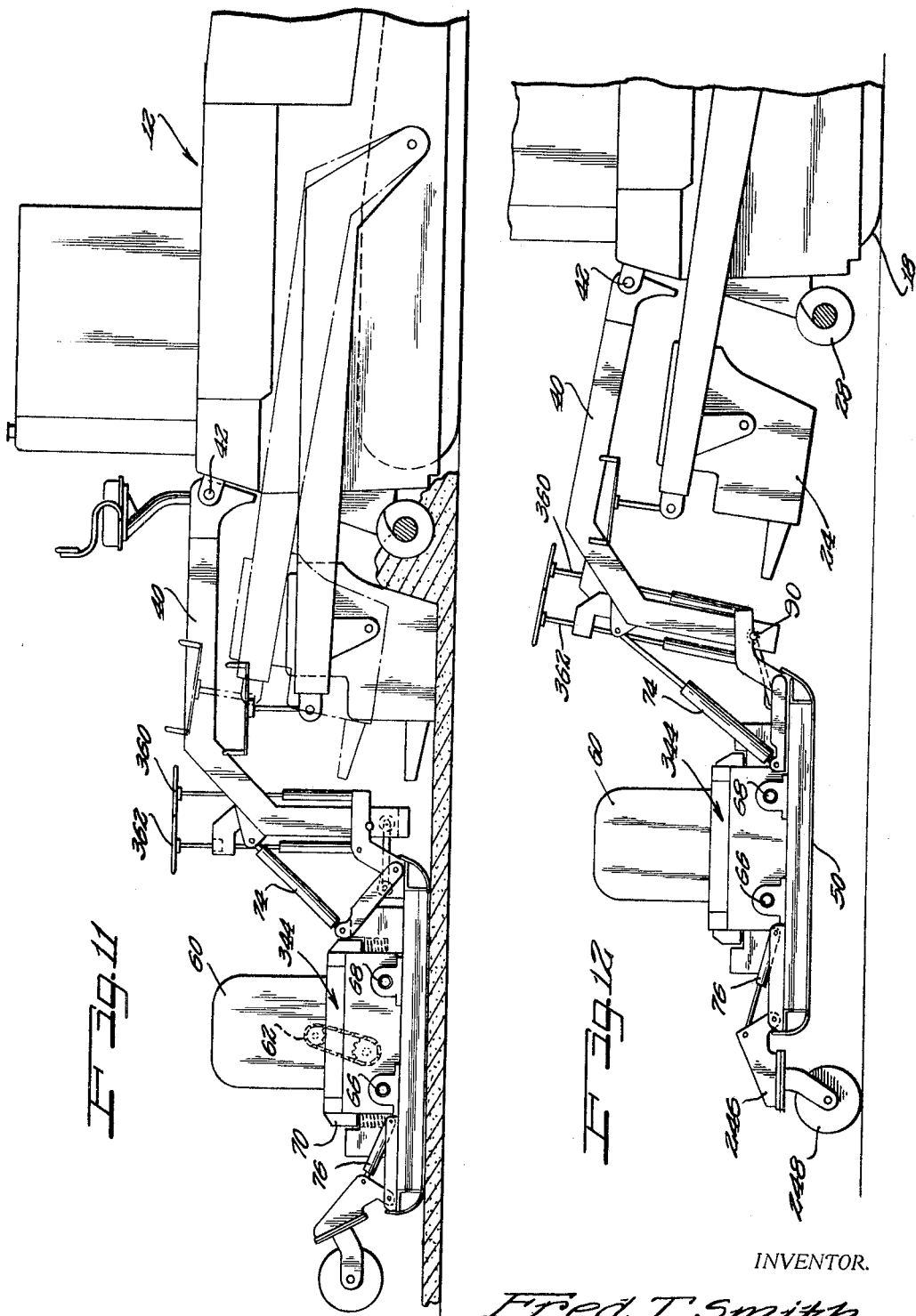

United States Patent Office 3,508,476
Patented Apr. 28, 1970

3,508,476
METHOD AND APPARATUS FOR TOWING AND SUSPENDING A COMPACTOR FROM A PAVER
Fred T. Smith, Aurora, Ill., assignor to Barber-Greene Company, Aurora, Ill., a corporation of Illinois
Filed Aug. 30, 1967, Ser. No. 664,386
Int. Cl. B31b 1/16
U.S. Cl. 94—48                                28 Claims

ABSTRACT OF THE DISCLOSURE

A towing and suspension apparatus for a towed compactor including a pair of towing arms, a frame connected to the towing arms, a vibrating screed, a motor mounted on the frame for vibrating the screed, a lateral drift control ram to position the compactor, a pair of caster wheel assemblies attached to the opposite end of the frame from the towing arms for use in traveling, and hydraulic rams for maintaining the traveling position.

FIELD OF THE INVENTION

The present invention relates to improvements in road finishing machines and techniques and to such machines which finish bituminous or the like paving materials along a roadway. More particularly the instant invention is concerned with the use of a plate towed compactor associated directly with a paver.

PRIOR ART

It is known to use a roller as a separate element in finishing the bituminous paving materials along a roadway. The prior art devices have separated the finisher and roller because of the inability of placing the roller close to a paver screed. The rollers have been self-propelled because of the impossibility of propelling the roller with a tractor. Such devices in addition to requiring their own prime mover also require a special operator.

In the use of a self-propelled roller or compactor, the bituminous material is put down by a finisher and allowed to cool. The roller is then used to compact the lift in at least two passes over the lift to complete the finishing of the roadway surface.

It is desired to lay the asphalt in thicker lifts, six to ten inches or more. A roller on six to ten inches of asphalt will cause the asphalt to move in a random fashion and does not permit finishing in a desired contour. As a result, rolling a six to ten inch lift is extremely difficult.

SUMMARY

In accordance with the principles of the present invention, I have provided new apparatus for towing and suspending a compactor from a finisher having a pair of towing arms connecting the compactor to the finisher, a vibrating screed supported by a frame connected to the towing arms, hydraulic rams to maintain the compactor in a traveling position, and a hydraulic ram to control lateral drift.

Accordingly, an important object of this invention is to provide a new and improved apparatus for towing and suspending a compactor from a finisher.

A further object of the present invention is to provide a compactor apparatus which may be towed.

Still a further object of the present invention is to provide a compactor apparatus which may compact bituminous lifts of greater thickness than had been previously possible.

Yet a further object of the present invention is to provide apparatus for towing and suspending a compactor which eliminates at least one operator and a separate compacting operation.

Many other advantages, features and additional objects of the present invention will become manifest to those versed in the art upon making reference to detailed description and the accompanying sheet of drawings in which preferred structural embodiments incorporating the principles of the present invention are shown by way of illustrative example.

ON THE DRAWINGS

FIG. 2 is a side plan view of the compactor suspension and towing apparatus of FIG. 1 in the operating position;

FIG. 3 is a side plan view similar to FIG. 2 showing the compactor in a traveling position;

FIG. 4 is a side plan view of the compactor including the suspension and towing apparatus in the disconnected position;

FIG. 5 is a top fragmentary sectional view of the lateral drift control arm;

FIG. 6 is a top fragmentary sectional view of the transverse vibrating shafts;

FIGS. 7 to 9 are views similar to FIGS. 1 to 3 showing a modified suspension and towing apparatus for compactors;

FIG. 7A is a partial sectional view of the lateral drift control device;

FIG. 7B is a diagrammatic view of the hydraulic control system for the lateral drift control device; and FIGS. 10 to 12 are views similar to FIGS. 1 to 3 showing a further modified suspension and towing apparatus.

AS SHOWN IN THE DRAWINGS

Figure 1:
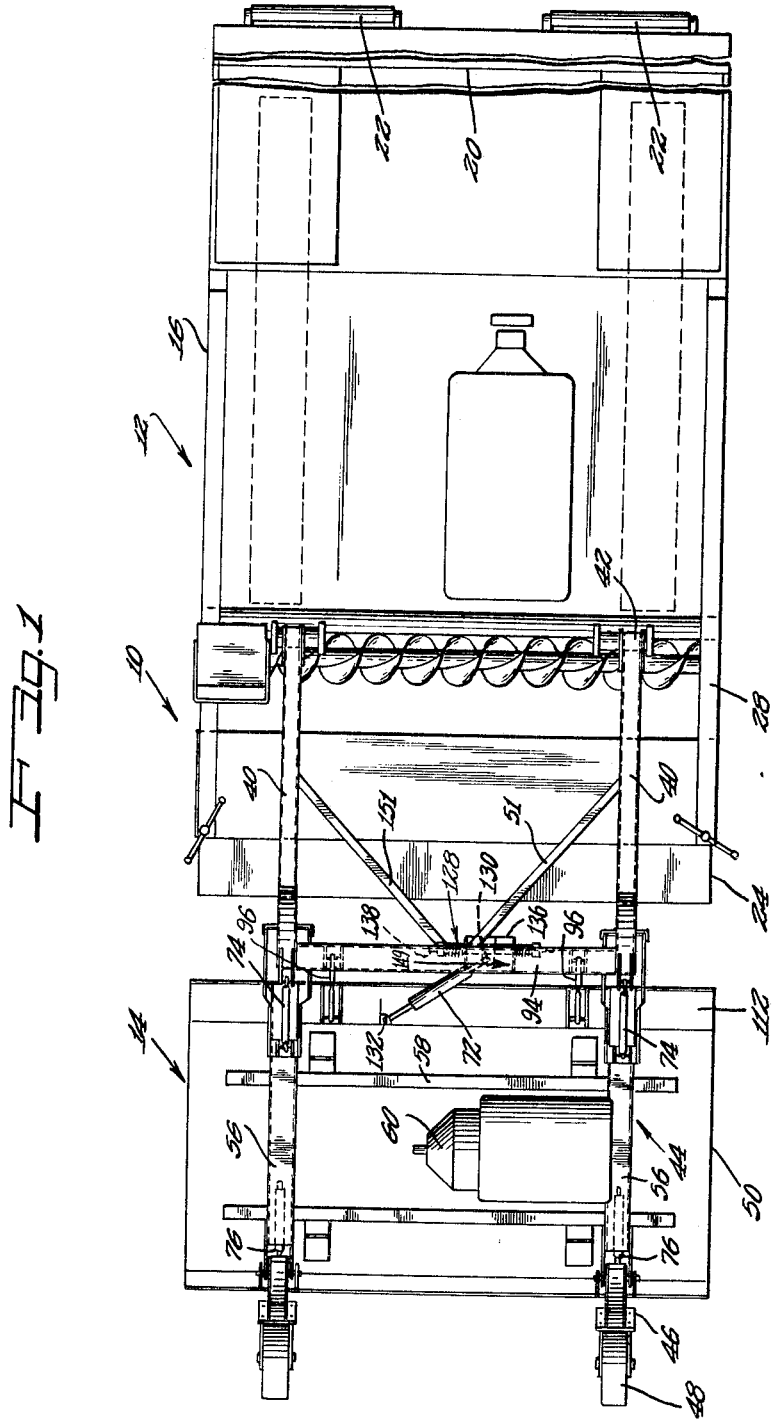
FIG. 1 is a top plan view of the suspension and towing apparatus for a compactor in accordance with the invention.

The principles of this invention are particularly useful when embodied in a towing and suspension apparatus for a compactor associated with a finisher as illustrated in FIGS. 1 to 4, generally indicated by the numeral 10. The paving machine 10 includes a paver or finisher 12, such as a Barber-Greene Model SA-41, and a towed compactor 14.

The paving machine 12 includes a paver frame 16 which is mounted on crawlers or tracks 18. At the forward end of the paver 12 is a hopper 20 for receiving paving materials from a dump truck in a conventional manner. Teh front of the frame 16 has a pair of rollers 22 adapted to engage with the rear of the dump truck as the paving material is unloaded into the hopper 20.

At the rear of the paver 12 is a screed assembly 24. Disposed between the hopper 20 and the screed 24 is a screw mechanism 26 for distributing the paving material from the hopper and depositing the same upon the ground in front of the screed 24.

The paver 12 has a pair of leveling or draft arms 28 pivoted on the frame 16. The arms 28 move the screed 24 up and down.

The plate towed compactor 14 is connected to the paver 12 by a pair of parallel towing arms 40 which are attached to the paver 12 by a pair of towing assemblies 42. The towed compactor 14 has a motor frame 44 connected at one end to the towing arms 40 and at the opposite end are a pair of caster assemblies 46 each having a caster wheel 48. The compactor 14 has a vibrating screed or plate 50 disposed beneath the frame 44.

The frame 44 has a pair of longitudinal members 56 and a pair of transverse members 58. Within the frame 44 is a motor 60. The motor 60 drives a chain drive 62 for a transmission 64 that drives a pair of transverse shafts 66, 68. Connected to each of the frame members 58 are pairs of vibration dampeners 70 and 70a each of which includes an isolation coil suspension spring 71, FIG. 6.

The screed frame 150, FIGS. 2 and 6 is connected to and dampened from the motor frame 44 by the isolating springs 71. The isolating springs 71 are so arranged that vibrating energy is dampened before it reaches the motor frame 44 and are tied to the motor frame 44 through links that provide motion in a vertical direction. Two of these dampeners 70 have the links positioned 90° from the other two 70a. The links of dampeners 70 are mounted to the vibrating plate 50 to be out of phase with the angle of rotation of the links of dampeners 70a. This means that the whole dampener 70 pivots in one direction, and provides that two of the dampeners 70 cancel the horizontal motion of the alternate dampeners 70a. The motor frame 44 is supported on a series of rubber pads (not shown) within the vibration dampeners 70, 70a.

The plate towed compactor 14 has means comprising a hydraulic lateral drift control actuator or ram 72 to control the position of the compactor with respect to the finisher 12. Attached to the frame 44 are means comprising a pair of forward three way hydraulic cylinders 74 and a pair of rear hydraulic actuator cylinders 76 which raise and lower the plate towed compactor 14 from an operating position to a traveling position. The cylinders 74 are free floating in the retracted position, FIG. 2, and have power only in extending. Only one of each pair of hydraulic cylinder actuators and associated structural members is shown in side views, FIGS. 2, 3, and 4, and the corresponding member is on the opposite side of the plate towed compactor 14.

In the operating or floating position the rotating latch 80 is secured to a floating member 86, FIG. 2. In this position the floating member 86 is movable up and down on the vertical portion of the towing arms 40. Correspondingly, the motor frame 44 floats with respect to the plate 50. The limits of movement of the floating member 86 are a support pin 90 and the end of the vertical portion of the towing arms 40.

The tow bars 40 are joined by a horizontal member 94 which is connected by a linkage 96 to a horizontal joining member 112 fixed to the motor frame 44. The linkage 96 comprises a forward and rear rotatable ball joint 114, 116 respectively, and a threaded bar 118 which engages the ball joint members 114, 116 by a pair of nuts 120, 122 respectively, for the front and rear ball joints. The ball joints 114, 116 are in ball joint self aligning members 124, 126, respectively.

The lateral drift control ram 72 is secured to the tow bar horizontal joining member 94 by a spring device 128 having a ball joint 130 and to the frame joining member 112 by a rear ball joint 132.

The forward ball joint 130 is secured in a clevis 134 on a collar 136 which links it to a bar 138. The bar 138 is adapted for horizontal movement against a pair of springs 140 and 141 between a pair of stops 142. The ends of the bar 138 are secured by a pair of nuts 144. The bar 138 has at each end a cut away portion 146 which can move in the spaces 148 in the stops 142.

As the hydraulic cylinder actuator 72 is lengthened, the collar 134 may move to the right and compress spring 140. The spring 140 will in turn put a force as indicated by an arrow 149 into the compactor 14 to tend to move in that direction. As the cylinder actuator 72 moves in the opposite direction or is retracted, the spring 141 is compressed and the force is reversed which tends to move the compactor 14 in the opposite direction. The lateral drift control ram 72 and the spring 140 do not change the angle of the compactor 14 relative to the finisher 12 because the compactor is tied to the finisher with parallel towing arms 40. As a result when the compactor 14 is shifted to the side relative to the finisher 12, the compactor just moves parallel under influence of the lateral drift control ram 72 and the edge of the compactor 14 does not run parallel with the edge of the lift being compacted. This point will be further treated with respect to the embodiment of FIG. 7 below.

Connected to the horizontal towing arm member 94 are a pair of diagonal support arms 51 which are joined to the towing arm 40 for structural support, FIG. 1. The lateral control drift ram 72 is under control of the operator by means of a hydraulic control valve similar to that disclosed in FIGS. 7A and 7B.

The counter-rotating shafts 66, 68 drive the vibrating screed 50 from the V-belt drive 62 and the motor 60, FIG. 6. The shafts 66, 68 are mounted within a screed frame 150 attached to the motor frame 44 by means of the vibration dampeners 70.

The frame 150 consists of a pair of transverse members 152 and several longitudinal members 154 of shorter length. Each of the shafts 66, 68 has a plurality of off-center weights or eccentrics 156 mounted on stub shafts 158. The stub shafts are joined by couplings 160 and U-joints 162. Each of the eccentrics 156 is mounted between a pair of bearings 164. The V-belt drive 62 is connected to the shafts 66, 68 by means of a bear box 168.

The shafts 66, 68 mounted on the frame 150 are bolted to the screed 150 through the bearings 164. The frame 150 is turned connected to the frame 44 by means of the vibration dampeners 70 and coil springs 71.

In the operating mode, the frame 44 floats, FIG. 2, above the support pin 90. The motor frame 44 through the floating member 86 rides up and down along the towing arms 40. The rams 74 and 76 are retracted.

In the traveling position the arms 74 and 76 are extended. The caster wheels 48 roll on the ground and support the rear of the plate towed compactor 14, FIG. 3.

Details of the plate towed compactor 14 are disclosed in my copending application filed on even date entitled "Plate Towed Compactor," Ser. No. 664,368.

The towing arms 40 are the propelling means for the plate towed compactor 14. In practice very little force is required to move the compactor 14 when it is vibrating. The frame 44 does not vibrate in correspondence with the screed 50. The vibrating screed 50 moves up and down and the motor 60 mounted within the frame 44 tends to float above it by compressing spring 71 of the vibration dampeners 70 to isolate the frames 44 and 150 mounted on the plate 50. This results in a greater amplitude of movement of the plate 50 than that of the motor frame 44. Thus, the motor 60 and the hydraulic and electrical system are not subject to the same vibration as the plate 50, but are protected somewhat by the spring suspension.

As the finisher 12 is steered to the right or left the linkages 96 assume the necessary angle so that the plate towed compactor 14 stays directly behind the finisher 12. The compactor 14 is also equipped to pass hot gases to the screed to prevent sticking of the bituminous lift material to the screed 50.

The plate towed compactor 14 is taken to the site where a bituminous lift is to be finished in the traveling position with the caster wheels 48 supporting the rear of the plate towed compactor 14. The finisher 12 tows the compactor in the traveling position. At the side of the finishing work, the latch 80 is rotated, the hydraulic cylinders 74, 76 are retracted by actuating the rectraction switch (not shown) of the hydraulic control system. This causes the plate towed compactor to assume a position having the plate towed compactor 14 supported by the vibrating screed 50, FIG. 3. The motor 60 is started to rotate the shafts 66, 68. As bituminous material is laid by the finisher 12 which is advancing along the roadway to be finished, the plate towed compactor 14 follows behind. The plate 50 is vibrating and compacts the lift of bituminous material to conform to the contour set.

With the latch 80 rotated to be disengaged from the floating member 86, and the hydraulic rams 74, 76 retracted, the plate towed compactor 14 rests on the screed 50 on a bituminous lift, FIG. 2. As the plate towed compactor 14 advances with the motor 60 running, the screed 50 vibrates in a vertical direction actuated by the counter-rotating shafts 66, 68.

The shafts are driven by the motor 60 through the V-belt 62 to a transmission 64 and a gear box 168. The shafts 66, 68 have operational control of different sections of the plate 50. The vibrating screed 50 moves up and down with respect to the motor frame 44.

The compactor 14 is advanced by the finisher 12 and its position with respect to the finisher 12 is controlled by the lateral drift control ram 72. The speed of the finishing operation is such that the operator can adjust the position of the plate towed compactor 14 by hydraulically moving the compactor 14 through the lateral drift control ram 72. The range of movement of the compactor 14 is indicated by the dotted lines on FIG. 5.

In the disconnected position, the compactor 14 rests upon the plate 50 the rear hydraulic ram 76 having retracted at the same time as the forward hydraulic ram 74, FIG. 4. The rotating latch 80 is engaged with the floating member 86. This corresponds to the traveling position, FIG. 3.

The compactor 14 when in operational relationship to the finisher 12 compacts the desired profile such as that left by the finisher 12 through the screed 24. As a result, the user achieves exactly what is desired, so that the asphalt of the like is placed and compacted in lifts of six to ten inches.

In some applications it may be necessary to have the bituminous lift or material confined at the edges. With coarser material, it has been found that edge confinement is not necessary. The bituminous material confines itself generally to up and down movement without confinement. The coarser materials do not tend to flow outward. The coarser materials tend to flow down and be compacted. However, with sandy or freer flowing material, edge confinement becomes important.

Another embodiment of a compactor towing apparatus is disclosed in FIGS. 7–9 which corresponds to FIGS. 1 to 3. The compactor 214 has a pair of V-shaped towing arms 216 which are attached by a vertical pivot assembly 218 to a finisher 12. The towing arms 216 are joined by a horizontal arm 220. Attached to the finisher 12 and forming apart of the suspension system for the towed compactor 214 is a hydraulic lateral drift control cylinder actuator 222 and spring housing 250. The motor 60 is supported on a box frame 244.

In the retracted position the hydraulic rams 74 and 76 place the suspension system for the towed compactor 214 in the operating position. In the extended position, the hydraulic rams 74, 76 lock the motor frame 244 to the towing arms 240 in a traveling position to support one end of the compactor 214. The caster assemblies 246 supporting the towed compactor 214 at the rear in the traveling position. Operation of this embodiment is similar to that for the embodiment disclosed in FIGS. 1 to 4.

The spring device 128 of FIG. 1 could be changed to cylinder actuator 222 which has one compression spring 252 that functions in both directions to change the position of the compactor 214 relative to the finisher 12. The cylinder actuator 222 illustrated in FIGS. 7A and 7B is thereby substituted for the device 72 of FIGS. 1 and 10. The housing 250 is attached to the arm 216 by the bolt holes 251. The cylinder actuator 222 has one end attached to a rod 258 by a linkage 224 and the other end mounted to the framework of the finisher 12 by bolts or the like (not shown). The hydraulic cylinder actuator 222 that positions the compactor 214 behind the finisher 12 is connected to a spring assembly 250, FIG. 7A. The spring assembly 250 is joined to one of the towing arms 216 and has a compression type spring 252 housed on the inside of a cylindrical housing 254 which is designed to hold the spring 252 under tension at each end by a pair of end plates 256. A rod 258 passes through the center of the spring 252. The hydraulic cylinder actuator 222 is actuated by a four-way valve 260 to compress the spring 252 to the right or to the left as shown in FIG. 7A. The amount of actuation of the hydraulic cylinder actuator 222 determines the amount of compression, and the amount of compression determines the force which tends to slide the compactor 214 to the right or to the left of the rear of the finisher 12.

This control is necessary for side hill or banking operations such as corners and curves since the compactor may tend to slide downward on a slope and may not be properly positioned behind the finisher. The operator then actuates the four-way valve 260 which moves the spring assembly 252 and causes a moment to tend to raise the compactor up the slope so that it will follow directly behind the finisher. This is determined by the operator by manual control. This operation is shown schematically in FIG. 7B. The hydraulic cylinder actuator 222 is actuated by the four-way valve 260 which is connected as indicated with accumulators 263 and 264. These accumulators 263, 264 can be pre-charged to predetermine pressure and when it becomes necessary to put the force into the compactor 214 to hold it from sliding downward on a slope, the accumulators 263, 264 then act as a spring. For example, if the compactor were sliding downward, the operator would actuate the four-way valve 260 so that hydraulic oil would flow into the cylinder as indicated by arrow 266. The oil would not flow directly into the cylinder but would flow into the accumulator 264 as indicated by arrow 268. This would create a force or a moment on the cylinder 222 as indicated by arrow 269, and this moment would be transferred to the compactor 214. As the finisher 12 advances this moment tends to hold the compactor 214 in a position directly on the mat that is being laid.

The accumulators 263, 264 also allow the finisher 12 to make slight movements without moving the compactor 214. For example, if the finisher 12 made a slight movement to the right, the oil in the cylinder actuator 222 would be transferred to the accumulator 263 and leave the compactor 214 still positioned on the mat. As the finisher straightened out the accumulated oil would move back into the cylinder actuator 222 and the system returns to equilibrium.

In operation, the pivot point of the compactor 214 is 218, FIG. 7. As the finisher 12 negotiates a curve in the road it is necessary for the compactor 214 to be moved over until it is in line with the material laid down by the finisher 12 as indicated by the curved line 270. As the compactor 214 moves in that direction the fact that it pivots at 218 means that the edge 272 of the compactor 214 would conform to the dotted line position of the compactor as shown at 274. This is an advantage in that it places the compactor 214 in the most efficient position for compacting on the mat, and makes it possible to give better edge coverage.

Another embodiment of compactor apparatus having a short motor frame 344 with frame members 356 and 358 is illustrated in FIGS. 10 to 12. The screed 50 is adapted to be extended by a variable length attachment screeds indicated by the edges 350 to increase the width of roadway surface compacted. The extension screeds may be attached to either or both sides of the screed 50. Operation of this embodiment is similar to that of FIGS. 1 to 4.

As the compactor 314 moves to follow the finisher 12, it moves over on parallel links and as a result the edge 351 is not parallel to the edge of the road as indicated by broken line 301 which is being laid. This is the reason for the disclosure in FIG. 10 of the hand wheels 360 and 362 which are adapted to change the angle of the compactor 314 relative to the finisher 12. This makes it possible to make the edge 351 conform with the curve 301 of the mat being laid. The wheels 360 and 362 are connected to a bell crank type mechanism (not shown) and are turned clockwise, for example, the bell crank moves the parallel link on the right side outward and pulls the parallel link on the left side inward, which automatically changes the angle of the compactor 314 behind the finisher 12.

Although modifications might be suggested by those versed in the art, it should be understood that I wish to embody within the scope of the patent warranted hereon all such embodiments as reasonably and properly come within the scope of my contribution to the art.

I claim:
1. In combination with a self-propelled paving finisher:
   a compactor;
   towing means connecting the compactor to and behind the finisher;
   wheel means and means connecting the wheel means at the rear of the compactor for movement between a compactor supporting position and a compactor supported position; and
   actuator means connected to and between said compactor and said wheel connecting means and operative to move the wheel connecting means and the wheel means between said positions to enable the compactor to be towed in a compacting position when the wheel means and connecting means are supported by the compactor and enabling the compactor to be supported on said wheel means in said supporting position for transportation from place to place.

2. A combination according to claim 1, said wheel means comprising a plurality of separate wheels each having said connecting means, and said actuator means comprising a separate actuator connected between the compactor and the respective connecting means.

3. A combination according to claim 1, said wheel means comprising a pair of caster wheel assemblies, and said towing means comprising a pair of towing arms pivotally attached to said finisher and relatively movably connected to said compactor.

4. A combination according to claim 1, said towing means comprising an arm structure, and mechanism including a selectively operable actuator and connected between said compactor and said towing arm structure adapted to be activated to lift the compactor on said arm structure.

5. A combination according to claim 1, including mechanism operative on and between said towing means and the compactor cooperative with said actuator means for elevating the compactor when the wheel means are in compactor-supporting position.

6. A combination according to claim 1, said towing means including lateral drift control means.

7. A combination according to claim 6, said towing means comprising a pair of towing arms, and said lateral drift control means comprising an actuator connected between said towing arms and said compactor.

8. In a compactor to be towed behind a paving finisher:
   a compactor frame supporting vibrator means;
   roadway surface compacting plate means vibrationally connected thereunder;
   towing arm structure having means for attaching it to the finisher and having downwardly extending rear end portions; and
   lost motion connecting means towingly connecting said downwardly extending portions to said frame and enabling vertical vibrational movements of said frame relative to said portions substantially avoiding transmission of such vibrational movements to said arms.

9. A combination according to claim 8, including means selectively operable between said arms and said frame to lift the compactor upwardly on said arms.

10. A combination according to claim 8, said arms being disconnectable from the finisher, and means operable between the arms and said frame for supporting the arms on the frame when the arms are disconnected from the finisher.

11. A combination according to claim 8, supporting wheels mounted on said frame, means for moving said supporting wheels between a compactor supporting position and an inactive position, and means operative between said arms and said frame cooperative with said wheel actuating means to elevate said compactor relative to said portions of the arms when the wheels are in the compactor supporting position.

12. A combination according to claim 8, said frame being movable laterally relative to said arm portions, and lateral drift control means connected between said frame and said arm portions.

13. A combination according to claim 8, said arm portions having a transverse bar connecting the same, and link means attaching said frame to said bar.

14. A compactor construction of the character described, comprised:
    a frame;
    vibrator driving means carried by said frame;
    compacting plate means relatively vibrationally mounted under said frame and having vibrator means driven by said driving means;
    towing arm structure having lost motion connection with said frame and adapted for connection with a self-propelled finisher for towing the compactor; and
    selectively operable latching mechanism in part on said frame and in part on said arm structure and operable for selectively connecting the frame substantially rigidly to said arm structure.

15. A compactor according to claim 14, said latch mechanism including an actuator connected between the arm structure and said mechanism and operative to raise said compactor on said arm structure when said rigid connection is effected.

16. A compactor according to claim 14, said latch structure including an actuator operative to move said arm structure into supported relation on said frame when said rigid connection is effected.

17. A compactor assembly for towed connection behind a paving machine, comprising:
    a compactor frame having therebelow relatively vibrationally connected compacting plate means and means for effecting compacting vibration of said plate means relative to said frame;
    tow arm structure adapted to be attached to the paving machine; and
    link means connecting said frame to said arm structure and having multipivotal connection with both enabling relative movement of said frame and said arm structure vertically and horizontally.

18. A compactor according to claim 17, including means connected between said frame and said arm structure to adjust position of the compactor laterally relative to said arm structure and said paving machine.

19. A compactor according to claim 17, comprising means connected to and between said frame and said arm structure and selectively operative to raise said compactor on said arm structure.

20. The combination of a paving machine and a towed compactor, comprising:
    a towing arm structure having means connecting it to the compactor;
    means pivotally connecting said towing arm structure the machine and compactor; and
    means connected to and between said machine and said arm structure and operable to effect relative pivotal adjustment of the arm structure and the machine and thereby between the machine and the compactor.

21. A combination according to claim 20, said means connecting said arm structure and said machine including a yieldable connection normally biased to maintain the compactor in a normal towed position relative to the machine.

22. A combination according to claim 21, said connecting means including a hydraulic actuator and a hydraulic circuit comprising accumulators and control valves operative to hold the compactor in desired alignment with the machine when operating on a slope.

23. In combination in a towed compactor assembly:
   a frame having connected therebeneath compacting plate structure, and supporting means connected to said plate for effecting compacting vibration of said plate structure;
   towing arm structure having means for attachment to a paving machine;
   means connecting said frame to said towing arm structure and enabling horizontal angular adjustment of the compactor relative to said arm structure; and
   means connected to and between said compactor and said arm structure for effecting said angular adjustment.

24. A combination according to claim 23, including means for effecting lateral adjustment of said frame relative to said towing arm structure in addition to said angular adjustment.

25. A lateral drift control device between a towing apparatus and a towed apparatus movable along a towing axis, comprising:
   a cylinder and piston actuator operable on an axis directed laterally relative to said towing axis and having one end mounted on one apparatus;
   a laterally yieldable member mounted on the other aparatus and movably biased into a neutral position;
   means operatively connecting the opposite end of the actuator to said member;
   fluid supply means connected to said actuator for operating said actuator; and
   means in said connection to control said fluid supply means to operate said actuator to shift said member against its bias and thereby adjust the lateral position of the towed apparatus with respect to said towing apparatus.

26. A device according to claim 25, said laterally yieldable member comprising a rod, means reciprocably supporting said rod, springs normally maintaining said rod in said neurtal position, and stop means on said rod engageable with said supporting means in respective opposite limits of reciprocal movement of said rod.

27. A self-contained compactor adapted to be connected in towed relation behind a paving machine which has pavement laying means and a screed assembly which is mounted on the machine for movement between a laid paving finishing position and an elevated position, said compactor comprising:
   a frame;
   a plate compactor carried under said frame in relative vibrational relation thereto;
   vibrating means mounted on said compactor;
   vibrator actuating means mounted on said frame;
   means operatively connecting said vibrator actuating means to said vibrating means; and
   towing arm structure substantially L-shape in side elevation having a forwardly extending portion including means for connecting it to the machine above and clear of said screed, and a downwardly extending rear portion having means on the lower part thereof attaching said lower part to said frame.

28. A compactor according to claim 27, said attaching means between said lower part and said frame being a lost motion connection, and mechanism selectively operable to latch the frame and arm relatively fixedly together.

References Cited

UNITED STATES PATENTS

| | | | |
|---|---|---|---|
| 2,094,910 | 10/1937 | Baily | 94—48 |
| 2,589,256 | 3/1952 | Horning | 94—46 |
| 2,633,781 | 4/1953 | Day | 94—48 |
| 2,890,632 | 6/1959 | Madison | 94—46 |
| 2,938,438 | 5/1960 | Hamilton | 94—48 |
| 2,947,230 | 8/1960 | Heer | 94—46 |
| 3,088,384 | 5/1963 | Heer | 94—46 |
| 3,208,362 | 9/1965 | Sigmund | 94—46 |
| 3,224,348 | 12/1965 | Maginniss | 94—48 |
| 3,253,522 | 5/1966 | Piper | 94—48 |
| 3,283,677 | 11/1966 | Uebel | 94—48 |
| 2,752,836 | 7/1956 | Pilch | 280—479 X |
| 2,759,310 | 8/1956 | Newkirk | 280—467 X |
| 3,291,013 | 12/1966 | Stolp | 94—50 |
| 3,379,456 | 4/1968 | Bogie | 280—446 |

NILE C. BYERS, JR., Primary Examiner

U.S. Cl. X.R.

280—446